Dec. 17, 1940.　　W. P-G. HALL ET AL　　2,225,535
BRISTLE FEEDING MACHINE
Filed June 7, 1938　　3 Sheets-Sheet 1
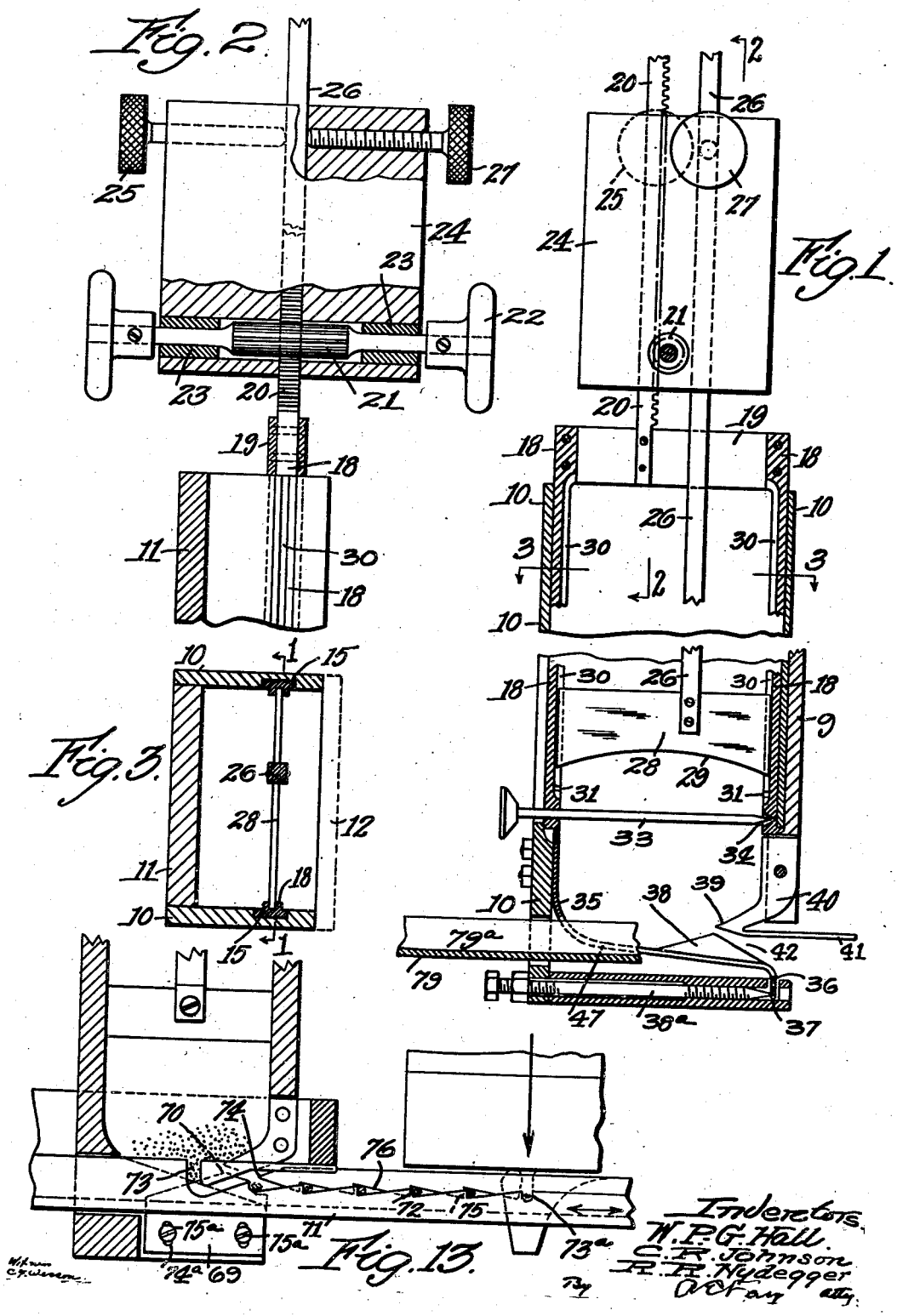

Dec. 17, 1940. W. P-G. HALL ET AL 2,225,535
BRISTLE FEEDING MACHINE
Filed June 7, 1938 3 Sheets-Sheet 2
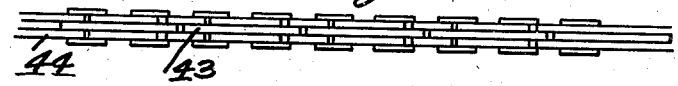
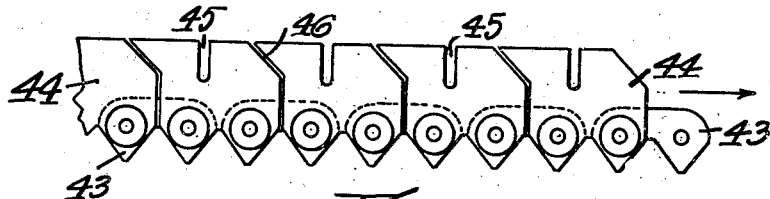
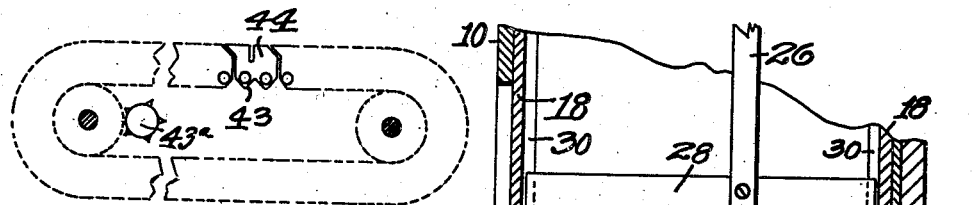
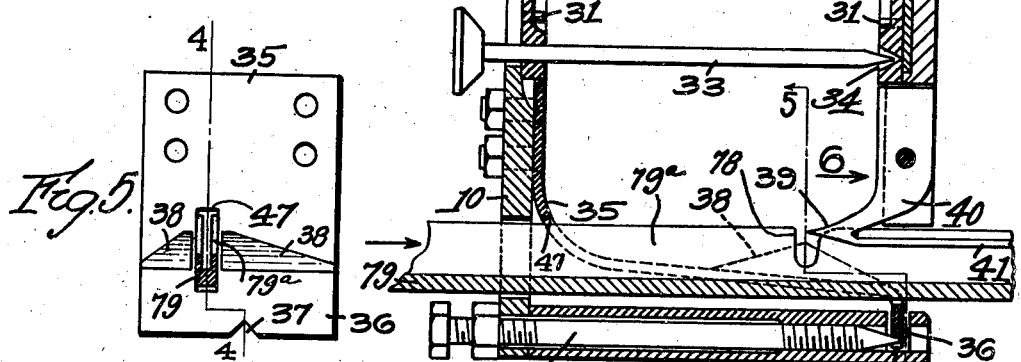
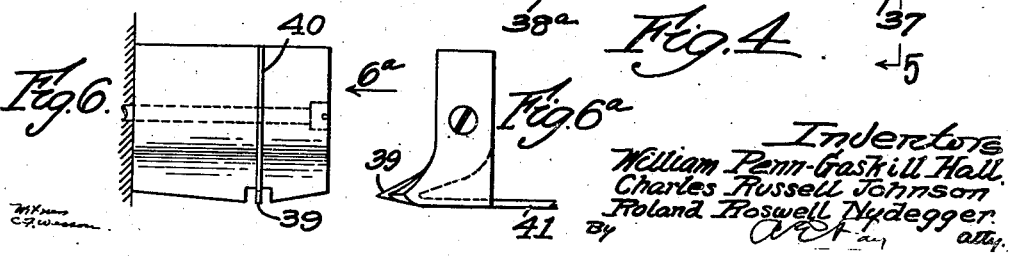
Inventors
William Penn-Gaskill Hall
Charles Russell Johnson
Roland Roswell Nydegger
By
atty.

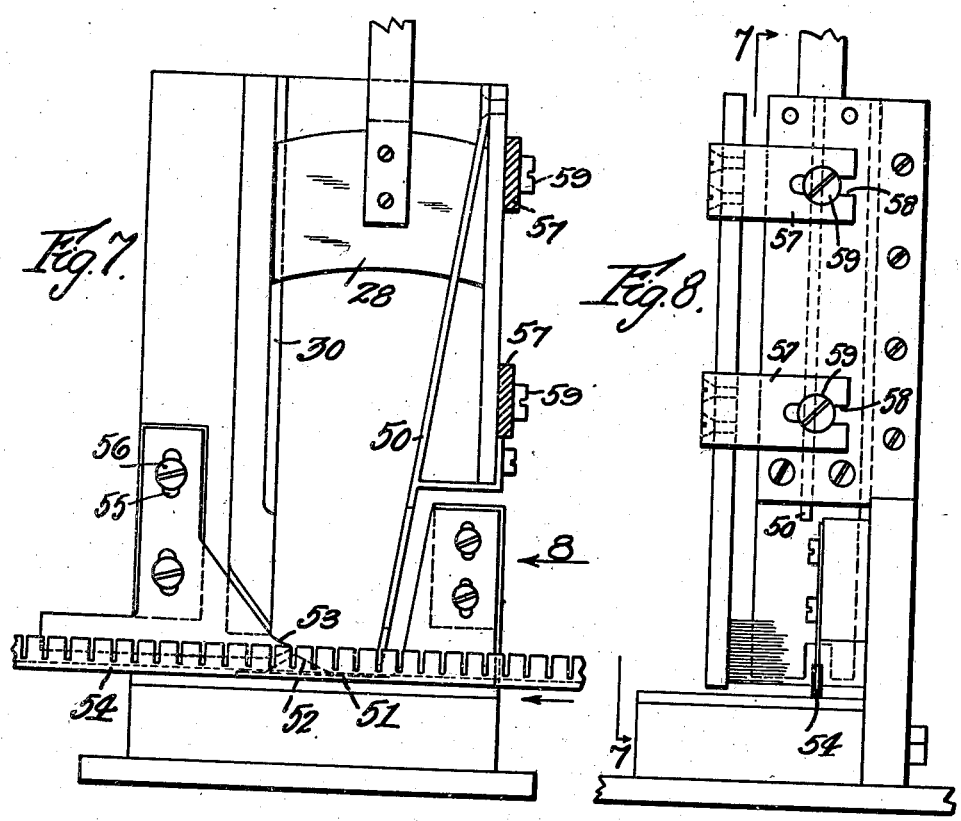
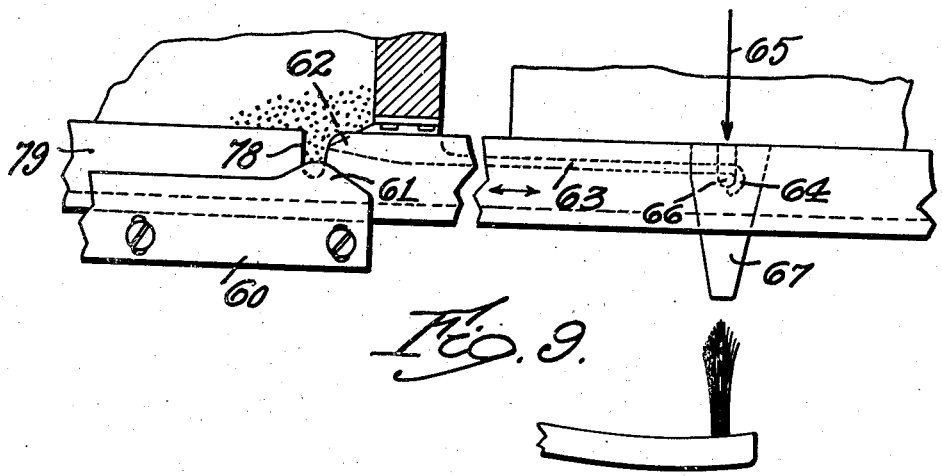

Patented Dec. 17, 1940

2,225,535

UNITED STATES PATENT OFFICE 2,225,535

BRISTLE FEEDING MACHINE

William Penn-Gaskill Hall, Berwyn, and Charles Russell Johnson, Glen Mills, Pa., and Roland Roswell Nydegger, Wilmington, Del., assignors to E. I. du Pont de Nemours & Company, Wilmington, Del., a corporation of Delaware Application June 7, 1938, Serial No. 212,370

18 Claims. (Cl. 300—7)

This invention relates to a machine for feeding bristles to be used for making tooth brushes, or other brushes, and in fact for feeding hog bristles, horse hair, wire, straw, short fibres, and the like, for any purpose.

The principal objects of this invention are to provide a new combination of hopper and picker, wherein a reciprocating or indexing picker cooperates with stationary dividing points on the hopper; to provide for adjusting said points while the machine is running to increase or decrease the size of the tuft at will, that is to be delivered; to provide a construction by which the feed is rendered comparatively uniform because the picker is filled more uniformly and reliably; to provide a simple and reliable means for adjusting the size of the tuft; to provide means for dividing and separating the bristles so as to separate those going into the tuft cleanly from those retained in the hopper; to avoid "lost" bristles; to provide an increase of speed of delivery by the indexing method which involves extreme simplicity of the moving parts and their connections and relations to each other; to provide a machine which can be loaded while running; to provide an improved picker, operating through the bottom of the hopper to take up the bristles therefrom and assemble them in tufts of uniform size for insertion into a brush back, and to provide forms of picker which will be practically useful for several kinds of feeding.

Other objects and advantages of the invention will appear hereinafter.

Reference is to be had to the accompanying drawings, in which—

Fig. 1 is a vertical sectional view of the casing of a hopper, for the purpose described, taken on the line 1—1 of Fig. 3;

Fig. 2 is an inside elevation of the hopper, as indicated by the arrow 2 in Fig. 1, and showing the weight in elevation and partly in section;

Fig. 3 is a transverse section of the same on the line 3—3 of Fig. 1;

Fig. 4 is an enlarged sectional view of the bottom of the hopper, like Fig. 1, except that some parts are in a different position;

Fig. 5 is a sectional view on the line 5—5 in Fig. 4;

Fig. 6 is an inside elevation of a side of the hopper for dividing the bristles and enabling them to be discharged properly, looking from the inside of the hopper in the direction of the arrow 6 in Fig. 4;

Fig. 6a is a view of the divider looking in the direction of the arrow 6a of Fig. 6;

Fig. 7 is a sectional view on the line 7—7 of Fig. 8 of a modified form of hopper and picker;

Fig. 8 is a front view of the same, as indicated by the arrow 8 in Fig. 7;

Fig. 9 is a side view of one form of picker having a very long stroke;

Fig. 10 is a side view of a preferred form of picker to be used in the hopper, shown in Fig. 1;

Fig. 11 is a plan of the same;

Fig. 12 is a view of the entire picker on a smaller scale to show its endless nature, and Fig. 13 is a side view of a further modified form of picker having a short stroke.

Referring to the first six figures, which all relate to one form of the invention, there is a hopper adapted to be supported or hung on the frame of a bristle tufting, feeding, and setting machine. This frame is not shown. This hopper consists, preferably, of two vertical end walls 10, made alike, but, of course, rights and lefts, a side wall 11, and a side wall 12. The latter may be made of pyroxoloid or other transparent material to permit observation of the bristles inside. These walls are fixed together and extend to the bottom of the casing. One of the walls 10 is fixed to a wall 9 extending part way to the top. Each of the walls 10 has a vertical groove or T-slot 15 extending from top to bottom for receiving a slide 18. These two slides 18, one on each side, are connected at the top by a horizontal cross bar 19 to which they are rigidly secured. The parts 18 and 19 constitute a slide guided in the two T-slots.

On the cross bar 19 is secured a vertical rack 20 adapted to be moved up and down relatively to the weight by a pinion 21 with a hand wheel 22 on each end. The shaft of the pinion is supported in bearings 23 carried by a weight 24. The weight 24 is fixed to the rack 20 by a thumb screw 25 when the weight is lifted to the desired point.

Also running through the weight 24 vertically is a rod 26 adapted to be fixed to the weight by a thumb screw 27. This rod 26 extends below the weight at one side of the cross bar 19 and has on the bottom a thin cross piece 28. This cross piece may have a concave lower surface 29 to rest on the bristles and transmit the weight of the weight to the bristles. This cross piece 28 is guided at each end in grooves 30 in the two slides 18. Each of said grooves 30 is curved at the bottom but has a pin 31 to form the final resting surface for the bar 28 if it ever gets down that far.

In this hopper is shown a pin 33 adapted to be set into and through one of the slides 18 through the hopper and into a recess 34 in the other slide 28 to support the conical end of the pin. This is a temporary pin placed in the hopper while it is being filled with bristles, to hold the pressure on the bristles at that point. It necessarily leaves them in a parallel condition, as indicated at the bottom of the hopper. The pin is to be removed after the operation of filling the hopper with bristles is completed.

To load the hopper with bristles, the pin 33 is introduced and the screw 27 is loosened. The operator takes hold of the rack 20 and holds it. If the weight has descended to a position, such as shown in Fig. 1, the screw 25 is loosened and one of the hand wheels 22 is turned to raise the weight far enough to allow the bristles to be introduced into the hopper under the weight and under the cross piece 28. Then the weight 24 is raised by turning either of the knobs 22. The bar 26 is pulled up by hand until the cross piece 28 comes up to contact with the bottom, or nearly so, of the cross bar 19. Now the screw 27 is tightened. The bristles fall on the pin 33 but that is soon withdrawn. Now the weight 24 is fastened to the rack 20 by the screw 25. Now the screw 27 is loosened and the cross piece drops on the top of the bristles. Then the screw 25 is loosened, the pin 33 is removed, and the weight is all transmitted to the cross piece 28 and presses on the bristles.

Let is be assumed that the bristles are loaded into the hopper. The cross piece 28 rests on the bristles at a point near the top of Fig. 1. The sides 10 are parallel from top to bottom. The weight will force the bristles down to rest on the picker bar to be described. The bottom 35 of the hopper has a vertical end which is fixed to the hopper by bolts and it extends downwardly on a curve and inclined part across the whole bottom and throughout the length of the hopper. It is provided with a downwardly extending projection 36 having in the center of it, or at another convenient point, a triangular opening or notch 37. Supported by the walls of the hopper is an adjusting screw 38a having a conical end which engages in this bottom notch 37. Obviously, by adjusting this screw back and forth, the height of the nearly horizontal, but slightly inclined, flexible bottom 35 can be raised or lowered. On this bottom are two tapering projections 38, coming into close proximity to a sharp projection 39 between them on a thin metal member 40 fixed to the discharge side of the hopper near the bottom thereof. This metal member 40 has a horizontal extension 41 which, as will be seen, will constitute the top of the space along which the bristles are fed after they leave the hopper to hold them down in a central longitudinal slot 79a in a picker, as 79, 54 or 44.

Now, it will be seen why the bottom 35 is adjusted. It is merely for varying the width of the slanting space 42 between the point 39 and the projections 38 so that the bristles will be drawn down into a notch 78 across the picker by the action of the picker. The projections 38 are arranged as shown in Fig. 5 to allow the bristles to assume a bow shape below the projection 39, if necessary, and prevent their being pierced by the sharp projections 39. The bristles fall into the notch 78 while the picker is moving in the direction of the arrow in Fig. 4. The point 39 controls the number of bristles in each tuft to be set into the brush. The picker slot crosses the opening 42 between 38 and 39 so that the point 39 removes the surplus similarly to a scraping operation.

In the form of the picker shown in Figs. 10, 11 and 12 it comprises an endless chain made up of links 43 and links 44. Each link 43 is pivotally connected with two of the links 44. Each link 44 is provided with a vertically downwardly extending notch 45 for receiving a tuft of bristles before the notch registers with the passage 42. The picker carries them farther along to the bristle forming device, which is not shown in this sheet of drawings but can be made like the one shown in Figs. 9 and 13, and will be described in connection therewith. These links 44 are arranged to fit each other while traveling horizontally by means of their inclined surfaces 46. It will be understood that this picker is of an endless character, as indicated in Fig. 12. It is comparatively thin and passes adjacent to the projection 38 and the point 39 through an opening 47 in the bottom 35. It has a central longitudinal slot like the slot 79a. It is operated in a step-by-step or intermittent motion, as by a star wheel 43a.

In the form of the invention shown in Figs. 7 and 8 the hopper may comprise simply side and end walls as before having the same guides 30 for the cross piece 28. It is shown with an inclined wall 50 which comes at the sides of the cross piece 28 to guide the bristles into a gradually narrowing space. In this case the bottom 51 is provided with two projections 52 corresponding with the projections 38 and with a point 53 corresponding to the point 39 and the feed is shown as to the left, as indicated by the arrow. This is designed for a sliding picker 54 operating the same as described above except that it moves, step-by-step to the left, whereas in the other case the picker moves in a step-by-step motion to the right. The notched pickers 43 and 54 each can be used with either form of hopper. The point 52 is adjusted by means of vertical slots and screws, as shown in Figs. 7 and 8. The bottom and projection 53 are similarly adjustable by means of vertical slots 55 and screws 56. The cross piece 28 and its weight, (not shown) but made like that shown in Figs. 1 and 2, act as in those figures. The front plate is upheld by brackets 57 with slots 58 and screws 59 for horizontal adjustment.

In the form of the device shown in Fig. 9 the hopper is not shown, but either one of the hoppers above mentioned can be used. Here there is an adjustable plate 60 having a projection 61, for the same purpose as the projections 38 and 52. A point 62 on the bottom of the hopper itself for the same purpose as the points 39 and 53 is also employed. Here the forward projection 63 extends a greater distance but still constitutes the top for the passage of bristles and has a hook 64 on the end. This picker has a very long stroke. A needle 65 descends, as is well known, indicated diagrammatically in the center of the bunch of bristles, and doubles them up into a tuft at a point 66. The tuft of bristles is caught in the stationary hook 64 near the center of the tuft. The needle furthermore descends through a funnel 67 and sets them into the brush back in a manner well known.

In the form shown in Fig. 13 we have the adjustable member 69 with its projection 70 and a picker 71 having a bristle carrying notch 73 and teeth 72 arranged at equal distances apart for taking the bristles out of the bottom of the hopper and carrying them, by a step-by-step motion, to the tuft-setting position. This picker has a stroke the length of the distance between two adjacent teeth. The member 69 is adjustable through the slots 74a and is fastened by screws 75a. These tufts of bristles are taken over in a step-by-step manner as indicated to a point 73a and pushed down into a brush in the same manner as illustrated in Fig. 9. The point 74 is of a different shape altogether and has a series of downwardly projecting teeth 75 at the bottom of the inclined surfaces 76 for holding the bristles down before they get to the point 73a and keeping them in the proper path to perform the function above described.

Having thus described our invention and the advantages thereof, we do not wish to be limited to the details herein disclosed, otherwise than as set forth in the claims, but what we claim is:

1. In a device for feeding bristles, the combination of a hopper having at one side an inwardly extending projection in stationary position, with a bottom adjustable while the machine is running, said bottom having a projection adjustable therewith and thereby forming an adjustable passage between said projections through which the bristles are adapted to be fed.

2. The combination with a bristle hopper having a passage therethrough at the bottom, of a picker for handling the bristles, formed of an endless chain having links thereon of the size and shape of said passage provided with transverse notches below their top surfaces and movable through said passage for receiving the bristles from the hopper.

3. The combination with a picker having notches for receiving bristles and movable by a step-by-step motion, of a hopper for receiving the picker having at its bottom adjacent to said picker a thin projection projecting upwardly, means for adjusting the bottom of the hopper together with said projection, and a projection from the side of the hopper cooperating with the first projection for the purpose of limiting the number of bristles fed therethrough.

4. In a device for feeding bristles, the combination of a hopper having at one side an inwardly extending projection in stationary position and a bottom having an adjustable projection extending therefrom toward the first named projection to limit the size of the path through which the bristles are adapted to be fed.

5. In a bristle holding and feeding device, the combination with a hopper for the bristles having an outlet from the bottom with its end located on an upward slant, of means in the hopper for restricting the number of bristles passing into the outlet, a picker movable through the bottom and said slant of the hopper and having a series of notches equally spaced apart and of the proper size to take each one the number of bristles desired, and a stationary member having a projection over said upward slant for separating the bristles into tufts of the proper size as the picker moves forward.

6. In a bristle holding and feeding device, the combination with a hopper for the bristles, of means for applying pressure downwardly on the bristles, an outlet from the bottom of the hopper, means in the hopper for adjusting and restricting the size of the bristle tufts passing out of the outlet, a picker movable through the bottom of the hopper having a longitudinal groove and having a series of notches equally spaced apart extending across said groove and of a size for each one to take sufficient bristles to form the size of tuft desired, and a stationary member having a projection extending down into said groove for removing the surplus bristles to retain tufts of the proper size in the picker as the picker moves forward.

7. In a bristle holding and feeding device, the combination with a hopper for the bristles, an outlet from the bottom of the hopper, and means in the hopper for restricting the size of the bristle tufts passing out of the outlet, of a picker movable through the bottom of the hopper and having a series of notches spaced apart and of a size for each one to take sufficient bristles to form the size of tuft desired, and a stationary member having a pointed projection having slanting upper and lower surfaces for removing the surplus bristles to retain tufts of the proper size in the picker as the picker moves forward, and having means for holding the tufts down as they are fed away from the hopper.

8. In a bristle feeding device, the combination of a hopper for bristles, means including a fixed projection in the hopper for restricting the size of a tuft of bristles that can be fed therefrom, a picker movable through the bottom of the hopper intermittently and having a downwardly extending notch in its upper surface for receiving the bristles from the hopper, said picker being adapted to move forward intermittently in long steps, a resilient member for engaging the bristles in said notch as the picker moves and holding them down, and a hook at the end of said member for limiting the position of the bristles as fed forward by said picker.

9. In a hopper for receiving and feeding bristles, the combination of a bottom having an upwardly extending projection, adjustable up and down, and a stationary wall having a projection over the first named projection and forming with it an inclined surface against which the bristles are received, the adjustment serving to control the space between the two projections.

10. In a hopper for the purpose described, the combination with the walls thereof having a slot in each of two opposite walls, a vertical slide in each of said slots, said slides being widely spaced apart, each slide having a vertical inside guide slot, a cross bar connecting the two slides at the top, a thin cross piece, guided in said guide slots, for holding the bristles down, and a weight supported by said cross piece.

11. In a device for receiving and feeding bristles, the combination with a hopper with an intermittently movable picker extending through the bottom thereof having a transverse notch for receiving the bristles while it is passing from one end of the hopper to the other, said picker having a central slot extending from one end to the other, of a projection extending from the inside of the discharge side of the hopper into said slot for removing the excess bristles to leave enough in said notch to form a tuft of the desired size, means for supporting the bristles at both sides of the picker, and means for adjusting the supporting means to regulate the size of the tuft of bristles, while the picker is operating.

12. The combination with a bristle hopper having bounding walls and a pair of vertical guides guided by said walls, said guides being connected together at the top to form a movable frame in the hopper, of a rack extending up from said frame, a weight through which the rack extends, a pinion supported by the weight and operatable by hand to move the weight up and down with respect to said frame, a cross piece guided within the hopper in a vertical motion, a rod extending up from the cross piece, supported thereby and adapted to be secured to the weight, and a thumb screw for fixing the rod to the weight.

13. As an article of manufacture, a picker for a bristle handling machine formed of an endless chain having links thereon, each link provided with a notch extending downwardly from its top surface for receiving the bristles from a hopper.

14. In a bristle feeding device, the combination with a movable picker, of oppositely slanting surfaces on opposite sides of the picker for supporting bristles and gradually separating the bristles adapted to be carried by the picker from surplus bristles by raising the central parts of the bristles supported therein so as to leave a triangular space between the two and separating the bristles at their ends to avoid entanglement.

15. In a device for receiving and feeding bristles, the combination with a hopper with an intermittently movable picker extending through the bottom thereof having a transverse notch for receiving the bristles, said picker having a central longitudinal slot, of a projection extending from the inside of the discharge side of the hopper into said slot for removing the excess bristles to leave enough in said notch to form a tuft of the desired size, supporting means for said bristles, and means for adjusting the supporting means to regulate the size of the tuft of bristles.

16. The combination with a bristle hopper, a movable frame in the hopper, of a rack extending up from said frame, a weight above the rack, a pinion supported by the weight and operatable by hand to move the weight up and down with respect to said frame, a cross piece guided within the hopper in a vertical motion, for resting on the bristles, a rod extending up from the cross piece, supported thereby, and means for fixing the rod to the weight.

17. In a device for feeding bristles, the combination of a hopper, and a picker having means to remove bristles from the hopper; with means on the hopper forming a wall of a passage for the bristles, a bottom for the hopper having means forming another wall for said passage, and means to adjust said bottom and its wall forming means to adjust the size of said passage.

18. In a device for feeding bristles, the combination of a hopper having a projection extending at one side thereof in stationary position, and a picker for said hopper, with an adjustable projection opposed to said stationary projection to form therebetween a bristle passage, and means whereby said adjustable projection may be adjusted while the device is running.

WILLIAM PENN-GASKILL HALL.
CHARLES RUSSELL JOHNSON.
ROLAND ROSWELL NYDEGGER.